May 19, 1970  YOSHIAKI ENDO  3,512,425
ANTIBACKLASH DRIVE SYSTEM
Filed Sept. 4, 1968  2 Sheets-Sheet 1

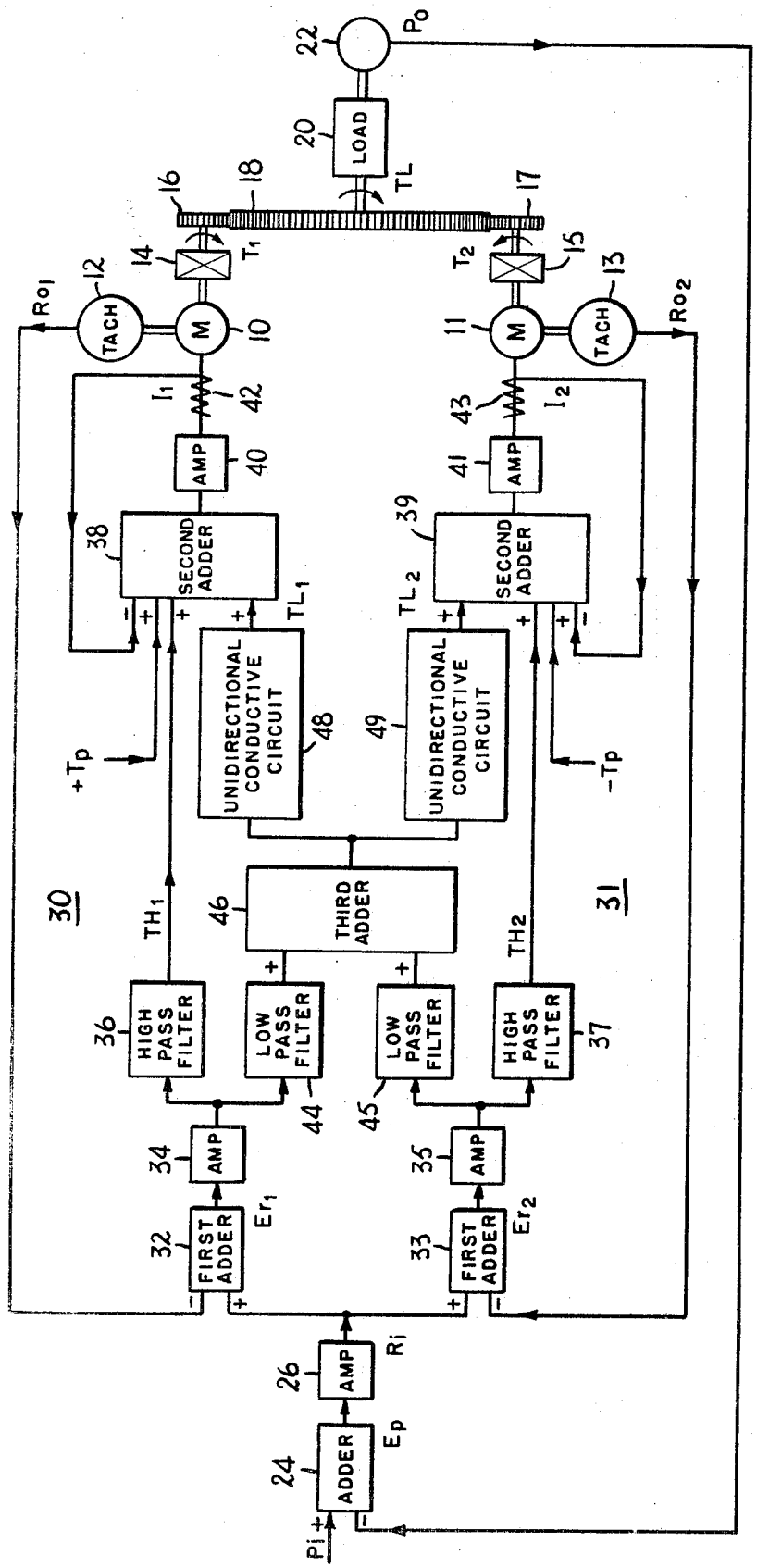

United States Patent Office

3,512,425
Patented May 19, 1970

3,512,425
ANTIBACKLASH DRIVE SYSTEM
Yoshiaki Endo, Amagasaki, Japan, assignor to Mitsubishi Denki Kabushiki Kaisha, Tokyo, Japan
Filed Sept. 4, 1968, Ser. No. 757,256
Claims priority, application Japan, Sept. 6, 1967, 42/57,108
Int. Cl. F16h *35/00, 55/18, 37/06*
U.S. Cl. 74—388                                    4 Claims

ABSTRACT OF THE DISCLOSURE

Two electric motors drive a load through separate trains of gears in opposite directions to form a mechanical resonance system. An actual position signal for the load is compared with a reference position signal to provide an error signal which is applied to two speed control loops. In each loop, an error of speed signal, representative of the difference between the error signal and an actual speed signal from the associated motor, is produced and divided into two frequency portions above and below a minimum one of the resonance and anti-resonance frequencies of the mechanical resonance system. The lower frequency portion from both loops are combined together. If positive, the combined signal is supplied to that loop coupled to the motor for forwardly driving the load and co-operates with a forwardly biasing torque signal to cause the motor to produce a forward torque equal to the sum of a predetermined forwardly biasing torque and a torque proportional to the error of speed signal. In the other loop, only an initial reversely biasing torque signal is effective for causing the other motor to produce a reversely biasing torque irrespective of the magnitude of the error of speed signals. If the combined signal is negative, the combined signal is applied to the other loop to control both motors in a similar but reversed manner. In the resonance frequency band of the resonance system, both higher frequency portions cooperate with the respective biasing torque signals to cause the speeds of the motors to reach a magnitude corresponding to the error signal.

BACKGROUND OF THE INVENTION

This invention relates in general to an antibacklash drive system and more particularly to such a system for effecting most effectively antibacklash drive in the presence of a mechanical resonance system composed of a moment of inertia of a load, a mechanical deflection of a load driving system and a moment of inertia of a drive involved.

The presence of backlash in a servo mechanism may frequently lead to the occurrence of a phenomenon known as hunting. Even if no hunting occurs, any external disturbance may abruptly change a torque on the associated load to cause the backlash to put the load in an erroneous position. It is highly desirable to eliminate such an undesirable backlash effect.

Heretofore there have been proposed various types of antibacklash drive systems. For example, one type of system has included a single drive such as an electric motor or a hydraulic motor for driving a load through a train of gears including alternate gears meshing with a pair of superposing gears disposed in slightly offset relationship such that each tooth on the alternate gears is resiliently sandwiched between the adjacent tooth on one of the superposing gears and the adjacent tooth on the other gear without any play on both sides of the each tooth. This type of antibacklash drive system has been effectively used to transmit a low torque, as in servo systems for use with small measuring devices, but is not suitable for transmitting torques exceeding a certain limit.

A second type of conventional antibacklash drive system also has a single drive for driving a load but through two trains of gears while gears in each train mesh with each other with no play in the opposite directions of rotation by having a torsion imparted to the trains of gears with their elasticity. The trains of gears cooperate with each other to perform the operation of the single train of gears used in the first-mentioned type of drive system. A torque applied to the gear trains through such a torsion depends upon an amount of backlash that may occur on each gear and therefore upon that position of one pinion where it meshes with the mating gear wheel. This leads to a fear that an undue torque may be applied to either of the two trains of gears and/or that they may abruptly increase in friction. If the trains of gears are required to be rigid, this fear will become predominant. The above-mentioned torque is sometimes referred to as a biasing torque.

Further, the use of two electric motors is well known. Each of the motors is operatively coupled to a common load through a separate train of gears to form a pair of motor systems having a torsion mechanically imparted therebetween. Both motors are arranged to drive the common load while the pair of motor systems are connected in series to each other. Alternatively, both motors may be controlled such that a flow of current through one of the motors is equal in magnitude to that through the other motor. If desired, an even number of electric motors may be used in pairs. The type of drive system just outlined is advantageous in that a rigidity factor and a biasing torque required for each of both trains of gears can be separately determined. However, as a differential gear was required to be used to couple the two trains of gears to each other through a spring or springs, it was disadvantageous in that the differential gear had different backlashes among its peripheral locations leading to a variation in initial torque and also that the necessity of providing an integral construction of the mechanism resulted in an increase in complexity of the construction of the gear trains.

Also, one or each pair of the electric motors could have its current controlled so that starting with a pair of biasing torques having a predetermined magnitude and opposing directions of action to each other, the motors could produce driving torques equal in magnitude and opposite in sense and superposing the respective biasing torques. This measure has been effective for maintaining the biasing torques unchanged irrespective of an angular position of a shaft on each motor. Also, because the biasing torques are electrically produced, the type of antibacklash drive systems just outlined is relatively simple in mechanical construction.

Like the second and third types of drive systems as above outlined, the last-mentioned type is disadvantageous in that if a torque on the load exceeds the particular biasing torque and an error of speed of each motor becomes higher than a certain value, both motors produce torques in a common direction, and hence are incapable of removing any backlash.

SUMMARY OF THE INVENTION

Accordingly, it is an object of the present invention to provide a new and improved antibacklash drive system which retains the antibacklash effect even though a torque on a load exceeds the biasing torque applied thereto.

It is another object of the invention to provide a new and improved antibacklash drive system including a pair of speed control loops having disposed therein the respective drives coupled to a common load through separate trains of gears to form a mechanical resonance system wherein the antibacklash effect is retained even if a torque on the load exceeds the biasing torque applied thereto in a range of frequencies which is less than the minimum resonance or anti-resonance frequency of the mechanical resonance system.

It is still another object of the invention to provide a new and improved anti-backlash drive system of the type described in the preceding paragraph wherein both the motors are controlled to have equal speeds of rotation for the particular common speed instruction in the resonance frequency band containing the resonance and/or antiresonance frequencies of the mechanical resonance system.

The invention accomplishes the above cited objects by the provision of an antibacklash drive system comprising, in combination, first and second drive means, a load, one train of gears for coupling a torque produced by each drive means to the load, comparison means for comparing an actual position of the load with a reference position thereof to provide an error signal, and a first and a second speed control loop operatively connected to the first and second drive means and having the error signal applied thereto, the first speed control loop being operative to cause the first drive means to produce both a predetermined forwardly biasing torque and a forward torque proportional to the error signal to forwardly drive the load, the second speed control being operative to cause the second drive means to produce both a predetermined reversely biasing torque and a reverse torque proportional to the error signal to reversely drive the load.

BRIEF DESCRIPTION OF THE DRAWINGS

The invention will become more readily apparent from the following detailed description taken in conjunction with the accompanying drawings in which:

FIG. 5 is a block diagram of an antibacklash drive system constructed in accordance with the principles of the invention.

DESCRIPTION OF THE PREFERRED EMBODIMENT

Figure 1:
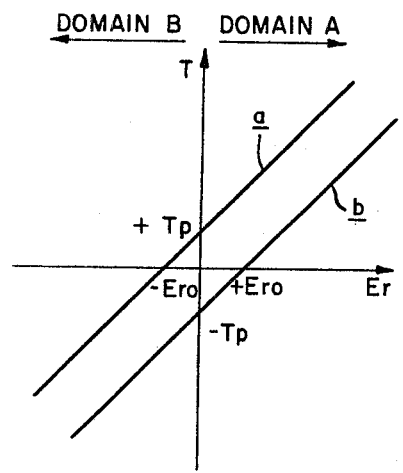
FIG. 1 is a graph illustrating the typical relationship between torque and error of speed for the prior art type drive systems.

Referring now to FIG. 1 of the drawings, there is typically illustrated the relationship between a torque T on the ordinate axis produced by a motor and an error $Er$ of speed of rotation of each motor on the abscissa axis for the prior art type antibacklash drive system using a pair of driving motors. Straight line $a$ designates a forward torque produced by that motor serving to produce a biasing torque $+T_p$ in the forward direction and straight line $b$ designates a reverse torque produced by the other motor serving to produce a biasing torque $-T_p$ in the rearward or reverse direction. If the torque produced by either of the motors becomes equal to zero, a speed error of $+Ero$ or $-Ero$ is developed in the forward or reverse direction as the case may be. A domain to the right of the axis of ordinates labelled by the reference character "A" is one in which a forward torque is supplied to a load while a domain to the left of the axis of ordinates labelled by the reference character "B" is one in which a reverse torque is supplied to the load.

From FIG. 1 it will be seen that the torque on the load exceeds the biasing torque $+T_p$ or $-T_p$ and hence the corresponding error of speed becomes greater in absolute magnitude than the error of speed $+Ero$ or $-Ero$ corresponding to the null torque produced by either of the motors that the torque produced by the one motor serving to produce the biasing torque in the forward direction is equal in direction to that produced by the other motor serving to produce the biasing torque in the reverse direction with the result that the antibacklash effect disappears.

Figure 2:
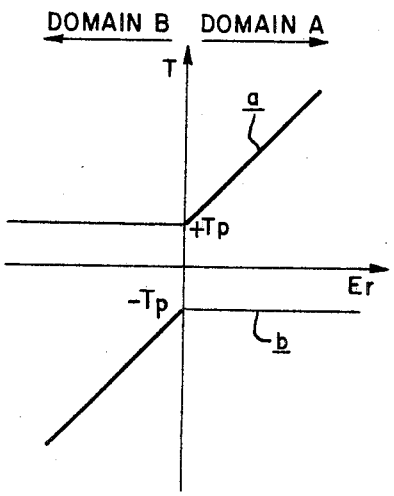
FIG. 2 is a graph similar to FIG. 1 but illustrating the invention.

The invention contemplates to eliminate the disadvantage just described. According to the principles of the invention, the torque produced by each of two motors and the corresponding error of speed should hold a relationship as illustrated in FIG. 2 wherein the same reference characters designate the corresponding quantities. More specifically, with the error of speed positive, one of the motors, effective to produce a biasing torque $T_p$ in the forward direction, is adapted to produce a torque equal to the biasing torque plus a forward torque directly proportional to the error $Er$ of speed of that motor in the domain A as shown by thick line $a$ in the first quadrant of the torque-to-error characteristic curve of FIG. 2. Simultaneously, the other motor produces a reversely biasing torque irrespective of the magnitude of the error of speed of that motor in the same domain as shown by the thin line in the fourth quadrant of the torque-to-error curve. On the other hand, if the error of speed is negative, then the other motor is adapted to produce a torque equal to the reversely biasing torque plus a reverse torque directly proportional to the error of speed of that motor in the domain B as shown by thick line $b$ in the third quadrant of the torque-to-error curve of FIG. 2 while at the same time, the one motor always produces the forwardly biasing torque irrespective of the magnitude of error of speed in the same domain as shown by the thin line in the third quadrant of the characteristic curve.

Figure 3A:
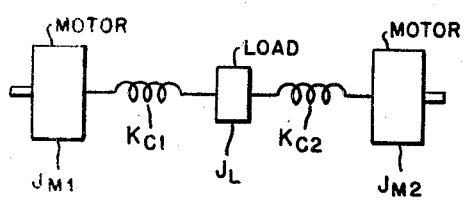
FIG. 3a is a mechanical equivalent circuit diagram of a mechanical resonance system including a pair of motors to drive a load.

The above-mentioned type of antibacklash drive system including a pair of motors for driving a common load through the respective trains of spring biased gears may be symbolically represented by a mechanical resonance system as illustrated in FIG. 3a. In FIG. 3a, one motor designated at a block $J_{M1}$ is connected to a load designated at a block $J_L$ through a spring $K_{C1}$ and another motor $J_{M2}$ is connected to the same load through another spring $K_{C2}$. The reference characters $J_{M1}$ and $J_{M2}$ and $J_L$ represent the moments of inertia of the motors and load and the reference characters $K_{C1}$ and $K_{C2}$ represent spring constants provided by both trains of gears connected between the motor and load respectively. If such a vibration system has at least one resonance frequency affecting the control characteristics of the corresponding drive system, a control system holding only the torque-to-error relationship as illustrated in FIG. 2 has a significant disadvantage that will be subsequently described.

Figure 3B:
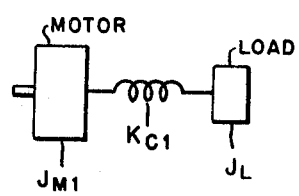
FIG. 3b is a diagram similar to FIG. 3a but illustrating a mechanical resonance system including a single motor to drive a load.

It is now assumed that a drive system is controlled in accordance with the torque-to-error characteristic as illustrated in FIG. 2 in the domain A where the error $Er$ of speed of each motor involved is positive. Under the assumed condition, the one motor serving to produce the forwardly biasing torque is controlled in accordance with the error $Er$ of speed of that motor while the other motor serving to produce the reversely biasing rearward torque is not all controlled in accordance with the error $Er$ thereof and loads the one motor. Therefore the resulting mechanical resonance system comprises the moment of inertia $J_{M1}$ controlled by the error $Er$ and connected through the spring constant $K_{C1}$ to a load having the moment of inertia $J_L$ and the moment of inertia $J_{M2}$ connected the moment of inertia $J_L$ through the spring constant $K_{C2}$. Thus it will be appreciated that the lowest resonance frequency of the mechanical resonance system is less than that of a mechanical resonance system composed of a moment of inertia $J_{M1}$ of a motor, a spring constant $K_{C1}$ of a train of gears operatively coupled to the motor and a moment of inertia $J_L$ of a load as shown in FIG. 3b. This necessarily leads to a disadvantage in that the entire servo loop involved has a reduced response speed.

If the motors are higher in moment of inertia than the load the above-mentioned disadvantage becomes very significant. In other words, the servo loop is inevitably required to greatly decrease in response frequency and hence an effective antibacklash drive is not accomplished.

Figure 4:
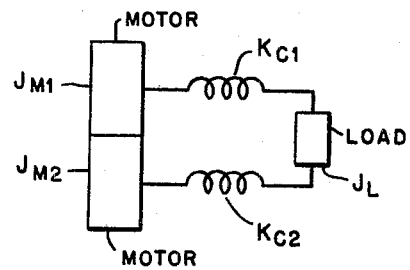
FIG. 4 is a mechnically equivalent circuit diagram of a mechanical resonance system for effecting an antibacklash drive in accordance with the principles of the invention.

The invention further contemplates to eliminate the significant disadvantage just described. To this end, a mechanical resonance system such as shown in FIG. 3a should hold the relationship between torque and error of speed as illustrated in FIG. 2 in a range of frequencies less than a minimum one of the resonance and antiresonance frequencies thereof while in the resonance frequency band thereof a control loop is provided which controls both the motors serving to produce the forwardly and rearwardly biasing torques such that the motors are operated at equal speed. It is noted that since any mechanical resonance system as shown in FIG. 3a has both a pair of resonance frequencies and a pair of antiresonance frequencies, the afore-mentioned resonance frequency band involves those frequencies. Thus it will be apparent that in the resonance frequency band, the moments of inertia $J_{M1}$ and $J_{M2}$ of the motors are controlled and both motors are united into a single unit. Therefore, in its resonance frequency band the mechanical resonance system can be expressed by a mechanically equivalent circuit as illustrated in FIG. 4 wherein the same reference characters designate the components corresponding to those shown in FIG. 3a. FIG. 4 shows both motors $J_{M1}$ and $J_{M2}$ united into a single unit and connected to a load $J_L$ through a pair of parallel springs $K_{C1}$ and $K_{C2}$.

It will be readily understood that the mechanical resonance system as shown in FIG. 4 has its resonance and antiresonance frequencies expressed respectively by $$2K_C/J_L$$

and $$\left(\frac{2}{J_L}+\frac{1}{J_M}\right)K_C$$

where it is assumed that $J_{M1}+J_{M2}=J_M$ and $K_{C1}+K_{C2}=K_C$. On the other hand, the mechanical resonance system without the antibacklash effect as shown in FIG. 3b has its resonance and antiresonance frequencies expressed respectively by $K_C/J_L$ and $$\left(\frac{1}{J_L}+\frac{1}{J_M}\right)K_C$$

where it is assumed that $J_{M1}=J_M$ and $K_{C1}=K_C$. Therefore it should be appreciated that the antibacklash drive system according to the principles of the invention make it possible to increase the resonance and antiresonance frequencies as compared with drive systems without the antibacklash effect.

Referring now to FIG. 5, there is illustrated one form of antibacklash drive system constructed in accordance with the principles of the invention thus far described. While the invention is equally applicable to a variety of drives, such as electric motors or hydraulic motors, the same will be described in terms of electric motors only for purpose of illustration. The arrangement illustrated comprises an electric motor 10, a speed detector such as a tachometer generator 12 mechanically connected to the motor 10 to provide a signal indicative of the actual speed of rotation of the motor, and a gear box 14 also mechanically connected to the motor and including a pinion 16 at the last stage thereof. The pinion 16 meshes with a last driving gear wheel 18 for driving a load 20, shown as being of the rotary type. It is to be understood that the load may be of the translation type. Another electric motor 11 having mechanically coupled thereto a speed detector 13 is operatively coupled to the driving gear 18 through components 15 and 17 identical to the components 14 and 16. Thus it will be appreciated that both motors 10 and 11 serve to drive the common load 20 through the respective trains of gears 14–18 and 15–18. It is now assumed that the motor 10 tends to drive the load 20 in one direction, the forward direction while the motor 11 tends to drive the load in the rearward, or reverse direction. The load 20 is mechanically connected to a position sensor 22 for indicating an actual position of the load relative to its datum. In other words, the position sensor 22 provides a signal $P_o$ representative of an actual position of the load.

The actual position signal $P_o$ is supplied to an adder 24 having also supplied thereto a position instruction signal $P_i$ opposite in polarity to the actual position signal $P_o$. The instruction signal $P_i$ indicates the position of the load to be assumed at the particular time. In the illustrated arrangement, it is assumed that the instruction position signal $P_i$ has a positive polarity while the actual position signal $P_o$ has a negative polarity as shown in FIG. 5. The adder 24 is operative to compare both signals $P_o$ and $P_i$ with each other to supply an error signal $E_p$ as to the actual position of the load 20 to an amplifier 26 disposed in a position control loop. The signal is amplified by the amplifier 26 to provide an output from the position loop which is, in turn, applied as an input signal $R_i$ to a pair of speed control loops generally designated by the reference numerals 30 and 31 respectively. The speed control loops 30 and 31 are operatively coupled to the motors 10 and 11 for the purpose of controlling the speeds of rotation thereof. Both the control loops are substantially identical in construction and operation and only one of the loops, loop 30, will now be described in detail and it should be understood that the components of the loop 31, designated by the odd reference numerals succeeding the even reference numerals designating the corresponding components of the control loop 30, function in the same manner as their corresponding components in the control loop 30.

The speed control loop 30 comprises a first adder 32, an amplifier 34, a high pass filter 36, a second adder 38 and a power amplifier 40 serially connected in the named order with the power amplifier 40 connected to the motor 10. An energy detector 42, in this case a current detector, such as a current transformer, is connected between the power detector 40 and the motor 10 to detect or sense a magnitude $I_1$ of current supply to the motor 10.

As shown in FIG. 5, the amplifier 34 is also connected to a low pass filter 44 which is, in turn, connected to the second adder 38 through a third adder 46 and a unidirectional conductive circuit 48. The third adder 46 has another input supplied from a low pass filter 45 in the loop 31 is also connected to a unidirectional conductive circuit 49 connected to a second adder 39 in the loop 31. Thus both the speed control loops 30 and 31 are cross coupled to each other through the components just described. The unidirectional conductive circuit 48 or 49 may preferably include a semiconductive diode poled so as to permit only a current with a predetermined polarity to flow therethrough. In the embodiment illustrated, it is assumed that only a positive current can flow through the circuit 48 in the loop 30 while only a negative current can flow through the circuit 49 in the loop 31.

It is to be noted that the high pass filters 36 and 37 are so designed and constructed as to pass the frequencies higher than approximately a minimum one of resonance and antiresonance frequencies of a mechanical resonance system composed of the motors 10 and 11, the common load 20 and the gearing 14–18 disposed therebetween and that the low pass filters 44 and 45 are so designed and constructed to pass the frequencies lower than approximately the said minimum frequency.

As shown in FIG. 5, the actual speed signal $R_{o1}$ is negatively fed back to the first adder 32 of the speed control loop 30 and combined with the error-of-position signal $R_i$ to provide an error of speed signal $E_{r1}$. After the amplification, the error of speed signal is applied to the high and low pass filters 36 and 44 to provide a frequency component higher or lower than the minimum resonance or antiresonance frequency of the mechanical resonance system respectively, as the case may be. The higher frequency component, labelled by the reference characters $TH_1$, is applied to the second adder 38 while the lower frequency component is applied to the third adder 46 where it is combined with the similar frequency component from the low pass filter 45 in the other loop 31. If the combined signal has a positive polarity, then it passes through the positively conductive circuit 48 to the second adder 38. Alternatively if it is of the negative polarity it passes through the negatively conductive circuit 49 to the second adder 39 in the other control loop 31. The higher frequency component $TH_1$ serves to produce a higher frequency torque portion by the motor 10 in the forward direction and the lower frequency component from the output of the positively conductive circuit 48, labelled by the reference characters $TL_1$, serves to produce a lower frequency torque portion by the motor 10 in the forward direction. A signal $+T_p$ is shown in FIG. 5 as being applied to the second adder 38 with the same polarity as the signals $TH_1$ and $TL_1$ for the purpose of producing a forwardly biasing torque by the motor 10.

As shown in FIG. 5, the current $I_1$ sensed by the current detector 42 or the output from the power amplifier 40 is negatively fed back to one input of the second adder 38. Therefore the second adder 38 provides a differential signal between the torque signals $TH_1$ or $TL_1$ and $T_p$ and the current signal $I_1$. This differential signal is amplified by the power amplifier 40 and then supplied to the motor 10.

The process as above described is repeated with the speed control loop 31 having appearing at the various points corresponding to the above-mentioned points in loop 30, signals $Er_2$, $TH_2$, $TL_2$, $-T_p$, and $I_2$ corresponding to the signals $Er_1$, $TH_1$, $TL_1$, $+T_p$ and $I_1$ appearing in the speed control loop 30.

Therefore the motor 10 has supplied thereto the current $I_1$ equal in magnitude to the sum of the signals $TH_1$, $TL_1$ and $+T_p$ to produce a torque $T_1$ proportional to the sum of the signals and of a polarity predetermined so as to drive the load 20 in the forward direction provided that the sum of the signals $TH_1$, $TL_1$ and $+T_p$ is positive. Similarly the motor 11 produces a torque $T_2$ proportional to the signal $TH_2$ plus the signals $TL_2$ minus the signal $T_p$ and having its polarity predetermined so as to drive the load in the rearward or reverse direction provided that the total signal $TH_2+TL_2-T_p$ is negative.

Under these circumstances, the rotational movements of the motors 10 and 11 are sped up or down by the respective gear boxes 14 and 15 and then transmitted through the respective pinions 16 and 17 to the common driving gear wheel 18 to drive the load 20 in a desired direction.

It is now assumed that the error of speed signals $Er_1$ and $Er_2$ is null. In other words, the load 20 is maintained in its instructed position and the motors 10 and 11 are stopped. Then all the signals $TH_1$, $TH_2$, $TL_1$ and $TL_2$ are also null and the motor 10 will produce a torque corresponding in magnitude to the torque signal $+T_p$ serving to drive the load 20 in the forward direction while at the same time the motor 11 will produce a torque corresponding in magnitude to the torque signal $-T_p$ serving to drive the same load in the reverse direction. In other words, the torques produced by the motors 10 and 11, respectively, are equal in magnitude and opposite in direction to each other. This ensures that all the gears disposed between the motors 10 and 11 and the load 20 mesh with each other in such a manner that all backlashes between the gears in each of the gear boxes 14 or 15, between the pinion 16 and the driving gear wheel 18 and between the pinion 17 and the gear wheel 18 are substantially completely eliminated resulting in the antibacklash effect.

As previously described, the actual position signal $P_o$ of load 20 sensed by the position sensor 22 is compared with the instructing position signal $P_i$ in the added 24 to provide the error of position signal $E_p$. The amplified error signal is applied as a speed input $R_i$ to each of the speed control loops 30 and 31 for controlling the operation of the motors 10 and 11 respectively. More specifically, each of the first adders 32 or 33 provides a differential signal $Er_1$ or $Er_2$ between the speed input $R_i$ and the actual speed signal $R_{o1}$ or $R_{o2}$ sensed by the associated tachometer generator 12 or 13. The signal $Er_1$ or $Er_2$ provides a difference between the actual speed of the associated motor 10 or 11 and the reference speed and after the amplification, each of the signals $Er_1$ or $Er_2$ is applied to the pair of the high and low pass filters 36 and 44 or 37 and 45 having the cut-off frequencies approximating the minimum resonance or antiresonance frequency of the mechanical resonance system composed of the components 10 through 20. Therefore it will be appreciated that the output from the low pass filter 44 or 45 comprises the lower frequency portion having its frequencies below approximately the minimum resonance or antiresonance frequency of the mechanical resonance system while the output from the high pass filter 36 or 37 comprises the higher frequency portion having its frequencies above that frequency.

The lower frequency portion from the output of the low pass filters 44 and 45 are added together by the third adder 46. If the output from the third adder 46 is positive, it is permitted to pass through the positively conductive circuit 48 to provide one input $TL_1$ to a current control loop composed of the adder, power amplifier and current detector 38, 40 and 42, respectively, for controlling a flow of current through the motor 10. Thus it will be appreciated that the current flowing through the motor 10 and therefore the torque produced by the latter is controlled in accordance with the sum of the signal $T_p$ serving to produce the forwardly biasing torque by the motor 10 and that portion of the summed signal $Er_1+Er_2$ having its frequencies below the minimum resonance or antiresonance frequency as above described and serving to drive the motor 10 in the forward direction. Therefore, for that portion of the summed signal $Er_1+Er_2$ having its frequency below the minimum resonance or antiresonance frequency as above described and being of the positive polarity, the torque produced by the motor 10 is controlled to follow the thick line $a$ in the first quadrant of the torque-to-error characteristic curve as shown in FIG. 2, that is, in the domain A.

With the third adder 46 providing a positive output, a current control loop composed of the second adder, power amplifier and energy detector 39, 41 and 43, respectively, for controlling a flow of current through the motor 11 has only supplied thereto the signal $-T_p$, as a control signal, having its frequencies below the minimum resonance or antiresonance frequency as above described, the signal $-T_p$ serving to produce the reversely biasing torque by the motor 11. This signal $-T_p$ is operated to produce the reverse torque by the motor 11 irrespective of the magnitude of each errior of speed signal $Er_1$ or $Er_2$. Thus it will be appreciated that for that portion of the summed signals $Er_1+Er_2$ having its frequencies below the minimum resonance or antiresonance frequency, as previously described, and being of the positive polarity, the torque produced by the motor 11 follows the thin line in the fourth quadrant of the characteristic curve as shown in FIG. 2, that is, in the domain A.

For that portion of the summed signals $Er_1+Er_2$ having its frequencies below the above-mentioned resonance or anti-resonance frequency and having a negative polarity, the torques produced by the motors 10 and 11 are similarly controlled to follow the lines in the second and third quadrants of the characteristic curves as shown in FIG. 2, that is, in the domain B.

On the other hand, the higher frequency portion of the summed signals $Er_1+Er_2$ appearing at the outputs of the high pass filters 36 and 37 and having frequencies above the minimum resonance or antiresonance frequency, as previously described, are applied to the current control loops as above described to control flows of current through the associated motors 10 and 11 respectively. Thus it will be apparent that in the resonance frequency band containing the resonance and antiresonance frequencies, both the speed control loops 30 and 31 are independently operated to control the motors 10 and 11 to cause their speeds to approximate the speed input R*i* whereby the corresponding mechanical resonance system can be typically represented by the equivalent circuit as illustrated in FIG. 4 in the resonance frequency band.

The invention has several advantages. For example, the antibacklash effect is retained even if the torque on the load exceeds the biasing torque. The biasing torque is not at all affected by the speed of rotation and position of any one of the rotating components. It is also simple in construction as compared with the prior art type systems and equally applicable to servo mechanisms for use with a wide variety of drive systems, including from small-sized motors to large-sized machines. Further, it is effectively applicable to such servo systems for use with loads whose mechanical resonance arises the significant problems for the purpose of providing stable servo mechanism with high degrees of accuracy.

While the invention has been illustrated and described in conjunction with a single preferred embodiment thereof, it is to be understood that numerous changes in the details of construction and the arrangement and combination may be resorted to without departing from the spirit and scope of the invention. For example, instead of the electric motors 10 and 11, a pair of hydraulic motors may be used, if desired. In the latter case, the power amplifiers 40 and 41 may be arranged to control the associated values disposed in hydraulic lines to the motors and the energy detectors 42 and 43 will sense the pressures of fluid flowing through the lines to provide electric signals. Also the invention may be equally applicable to a variety of servo mechanisms for use with drive systems by which the associated load is adapted to be translated with respect to its datum point.

What I claim is:

1. An antibacklash drive system comprising, in combination, first and second drive means, a load, a train of gears for coupling a torque produced by each drive means to said load, comparison means for comparing an actual position of the load with a reference position thereof to provide an error signal, and a first and a second speed control loop connected to the first and second drive means and having said error signal applied thereto, said first speed control loop operative to cause said first drive means to produce both a predetermined forwardly biasing torque and a forward torque proportional to said error signal to forwardly drive said load, said second speed control loop operative to cause said second drive means to produce both a predetermined reversely biasing torque and a reverse torque proportional to said error signal to reversely drive said load.

2. An antibacklash drive system as claimed in claim 1, wherein said train of gears includes a pair of gear trains coupled to respective ones of said drive means; and wherein said first and second drive means, said train of gears, and said load comprise a mechanical resonance system having resonance and anti-resonance, and wherein said first and second speed control loops, include means for rendering said first and second drive means operative to produce said respective torques in a range of frequencies below a minimum one of said resonance and anti-resonance frequencies of said mechanical resonance system.

3. An antibacklash drive system as claimed in claim 1 wherein said first and second drive means, said train of gears and said load comprise a mechanical resonance system having resonance and anti-resonance frequencies, and wherein said first and second speed control loops include means for rendering said first and second drive means operative to produce said respective torques in a range of frequencies below a minimum one of said resonance and anti-resonance frequencies of said mechanical resonance system while said first and second drive means are run at equal speeds in response to a common speed instruction in the resonance frequency band of said mechanical resonance system.

4. An antibacklash drive system comprising, in combination, first and second drive means, a load, one train of gears connected to each of said drive means, a last driving gear wheel in mesh with both said trains of gears and connected to drive said load in opposite directions; said first and second drive means, both said trains of gears, said last driving gear wheel and said load comprising a mechanical resonance system having resonance and anti-resonance frequencies; an adder circuit for comparing an actual position of said load with a reference position thereof to provide an error signal; a pair of first and second speed control loops connected to said adder circuit, means connecting said first and second speed control loops to said first and second drive means respectively; each of said speed control loops including means for developing an actual speed signal from its respective drive means, an adder circuit having applied thereto said error signal and said actual speed signal to produce an error of speed signal, a high pass filter and a low pass filter connected to the last-mentioned adder circuit and having respective cut-off frequencies approximating a minimum one of said resonance and antiresonance frequencies of said mechanical resonance system whereby said high pass filter provides an output signal including a frequency component of said second error signal having its frequencies above said minimum frequency and said low pass filter provides a frequency component of said second error signal having its frequency below said minimum frequency, and another adder circuit connected to said high pass filter and coupled to its respective drive means; a separate adder circuit connected to said low pass filters included in said pair of speed control loops; a first unidirectional conductive circuit connected to said separate adder circuit to permit a current signal having one polarity to flow therethrough and a second unidirectional conductive circuit connected to said separate adder circuit to permit a current signal having an opposite polarity to flow therethrough, means connecting said first unidirectional conductive circuit to the another adder circuit included in said speed control loop coupled to said first drive means, the last-mentioned another adder circuit including means receptive of a forwardly biasing torque signal to provide an output signal to said first drive means comprising the algebraic sum of the output signal from said high pass filter in the associated control loop, the output signal from said first unidirectional circuit and said forwardly biasing torque signal; and means connecting said second unidirectional conductive circuit to the another adder circuit included in the other speed control loop coupled to said second drive means, the last-mentioned another adder unit including means receptive of a reversely biasing torque signal to provide an output signal to said second drive means comprising the algebraic sum of the output signal from said high pass filter in the associated control loop, the output signal from said second unidirectional conductive circuit and said reversely biasing torque signal.

References Cited

UNITED STATES PATENTS

| | | | |
|---|---|---|---|
| 3,092,742 | 6/1963 | Smith et al. | 74—388 X |
| 3,168,838 | 2/1965 | Simon et al. | 74—388 |
| 3,241,389 | 3/1966 | Brouwer | 74—388 X |
| 3,310,998 | 3/1967 | Harmening | 74—409 X |

LEONARD H. GERIN, Primary Examiner

U.S. Cl. X.R.

74—409, 665